United States Patent
Wilde Von Wildemann

(10) Patent No.: US 9,510,513 B2
(45) Date of Patent: Dec. 6, 2016

(54) AFTER-THRESHING ARRANGEMENT FOR A COMBINE HARVESTER

(71) Applicant: DEERE & COMPANY, Moline, IL (US)

(72) Inventor: Philipp Wilde Von Wildemann, Kirkel Ot Limbach (DE)

(73) Assignee: DEERE & COMPANY, Moline, IL (US)

( * ) Notice: Subject to any disclaimer, the term of this patent is extended or adjusted under 35 U.S.C. 154(b) by 531 days.

(21) Appl. No.: 13/932,382

(22) Filed: Jul. 1, 2013

(65) Prior Publication Data
US 2014/0106831 A1   Apr. 17, 2014

(30) Foreign Application Priority Data

Oct. 15, 2012   (DE) .......................... 10 2012 218 742

(51) Int. Cl.
*A01F 12/52*  (2006.01)
*A01F 7/00*  (2006.01)
*A01F 12/18*  (2006.01)

(52) U.S. Cl.
CPC ................. *A01F 7/00* (2013.01); *A01F 12/52* (2013.01); *A01F 2012/188* (2013.01)

(58) Field of Classification Search
CPC ............ A01F 7/00; A01F 12/52; A01F 12/18; A01F 2012/188
USPC ....................................................... 460/11, 13
See application file for complete search history.

(56) References Cited

U.S. PATENT DOCUMENTS

| 616,899 | A | * | 1/1899 | Chalfant | ................. | A01F 12/52 460/13 |
| 1,406,394 | A | * | 2/1922 | Junkin | ..................... | A01F 12/52 460/63 |
| 3,115,142 | A | * | 12/1963 | Kepkay | ................... | A01F 12/18 460/14 |
| 3,247,855 | A | * | 4/1966 | Kepkay | ................... | A01F 12/52 460/14 |
| T872,011 | I4 | * | 3/1970 | Ashton et al. | ..........| A01F 12/16 460/106 |

(Continued)

FOREIGN PATENT DOCUMENTS

DE    2606588 A1    9/1976
DE    102005266608 A1    1/2007

(Continued)

OTHER PUBLICATIONS

European Search Report, dated Feb. 17, 2014 (5 pages).

*Primary Examiner* — Robert Pezzuto
*Assistant Examiner* — Joan D Misa

(57) ABSTRACT

An after-threshing arrangement for a combine harvester (10) comprises a returns conveyor (72), which is located downstream from a returns auger (52), and an after-threshing device (74), which is located within a housing (98), with a vertical rotation axis, which can be acted on in an axial direction from above with the returns from the outlet (86) of the returns conveyor (72), and a radially situated discharge opening (118) by means of which the after-threshed returns can be supplied to a conveyor (42) for the transport of the after-threshed returns to a cleaning device (46). For the active conveyance of the returns, an impeller (90) with a horizontal rotation axis is located between the outlet (86) of the returns conveyor (72) and the after-threshing device (74).

9 Claims, 3 Drawing Sheets

(56) References Cited

U.S. PATENT DOCUMENTS

| | | | | |
|---|---|---|---|---|
| 4,062,366 | A | * 12/1977 | De Coene | A01D 41/12 |
| | | | | 460/14 |
| 4,292,981 | A | * 10/1981 | De Busscher | A01F 12/18 |
| | | | | 460/14 |
| 4,310,004 | A | 1/1982 | De Busscher et al. | |
| 5,421,777 | A | * 6/1995 | Strubbe | A01F 12/18 |
| | | | | 460/13 |
| 6,342,006 | B1 | * 1/2002 | Bauch | A01D 41/1276 |
| | | | | 460/4 |
| 6,416,405 | B1 | * 7/2002 | Niermann | A01F 12/40 |
| | | | | 241/186.3 |
| 6,669,558 | B1 | * 12/2003 | Wolters | A01F 12/52 |
| | | | | 460/114 |
| 6,975,384 | B2 | 12/2005 | Ina | |
| 6,976,914 | B2 | * 12/2005 | Matousek | A01F 12/52 |
| | | | | 460/11 |
| 6,991,537 | B2 | * 1/2006 | Sahr | A01F 12/52 |
| | | | | 460/119 |
| 7,934,982 | B2 | * 5/2011 | Pope | A01F 12/52 |
| | | | | 460/14 |

FOREIGN PATENT DOCUMENTS

| | | | | |
|---|---|---|---|---|
| DK | WO 2009034442 A2 * | 3/2009 | | A01F 12/46 |
| EP | 0467027 A2 * | 1/1992 | | A01D 75/28 |
| EP | 2064940 A1 | 6/2009 | | |
| EP | 2719271 A1 * | 4/2014 | | A01F 7/00 |
| GB | 919327 A | 2/1963 | | |
| GB | 1495135 A * | 12/1977 | | A01F 12/18 |
| JP | WO 2011010479 A1 * | 1/2011 | | A01F 12/52 |

\* cited by examiner

AFTER-THRESHING ARRANGEMENT FOR A COMBINE HARVESTER

FIELD OF THE INVENTION

The invention relates to combine harvesters. More particularly, it relates to threshing arrangements for combine harvesters. Even more particularly, it relates to after-threshing arrangements for combine harvesters.

BACKGROUND

In combine harvesters, the grain obtained in the threshing and separating operations is cleaned in a cleaning device before it is deposited in a grain tank.

The cleaning device usually comprises an upper sieve and a lower sieve, which are made to swivel and which are acted on with an air current, so as to blow away the lighter-weight impurities such as chaff and smaller straw components, whereas the grain falls through openings into the sieves and finally arrives through conveyors at the grain tank.

At the back end of the lower sieve, there still remains a mixture of impurities and ears that were not sufficiently threshed, commonly called "returns".

The returns are either subjected to the threshing process a second time or (in another embodiment of combine harvesters is thoroughly threshed in a separate after-threshing device before it is again supplied to the cleaning device.

A typical such after-threshing arrangement is described in DE 26 06 588 A1. In the '588 arrangement, the returns auger supplies the returns to a paddle elevator, which conveys them at an incline forward and upward. The returns auger then allows them to fall downwards through an ejection opening and through an upper, semicircular housing part onto an after-threshing device.

The after-threshing device consists of a disk, which rotates around the vertical axis and is located in a cylindrical housing part, with vane-like carriers fastened thereon; on their upper sides, thrashing rods, bent backwards contrary to the rotation direction, are fastened. The threshing rods pass through between stationary rods, which are fastened on a removable rod carrier. A conical guiding element is fastened in the middle of the disk; its height corresponds to that of the vane-like carriers. The returns processed in the after-threshing device are ejected through a radial ejection opening onto a stepped bottom, which again supplies them to the cleaning device. The returns are discharged downwards at the upper end of the paddle elevator working from above, and arrive through the upper housing part by the force of gravity alone. What can be regarded as a disadvantage is that, with a lack of an active conveyance of the returns between the paddle elevator and the after-threshing device, components of the returns may collect in the upper housing part, in particular, with moist crops, and ultimately clog up the after-threshing device.

U.S. Pat. No. 6,975,384 B2 describes another after-threshing arrangement, in which an impeller located coaxial to the returns auger conveys the returns upwards to a second impeller, which conveys them in turn into the housing of an after-threshing device with vanes located radially relative to a rotation axis, which is inclined toward the outside at approximately 45°. Here, the impellers are used to thoroughly thresh the returns.

Finally, U.S. Pat. No. 4,310,004 A shows an after-threshing arrangement in which the returns auger, an impeller to convey the returns, and an after-threshing device with radially running arms are located coaxial on a common axis.

In view of the above, it would be beneficial to provide an improved after-threshing arrangement with a returns conveyor.

SUMMARY OF THE INVENTION

In accordance with one aspect of the invention, an after-threshing arrangement for a combine harvester is provided, comprising a returns conveyor having an outlet for the discharge of the returns, wherein the returns conveyor is located downstream from a returns auger, and with which the returns can be conveyed upward from a cleaning device; and an after-threshing device an after-threshing element located within a housing, and having a vertical rotation axis, which can be acted on in an axial direction from above with the returns from the outlet of the returns conveyor, and which has a radially situated discharge opening through which the after-threshed returns can be supplied to a conveyor for transporting the after-threshed returns to the cleaning device.

In accordance with another aspect of the invention, an after-threshing arrangement for a combine harvester is provided that comprises a returns conveyor which is located downstream from a returns auger and with which the returns can be conveyed from a cleaning device upwards and which has an outlet to discharge the returns.

Furthermore, the after-threshing device comprises an after-threshing element located within a housing and with a vertical rotation axis, and which can be acted on in the axial direction from above with the returns from the outlet of the returns conveyor and has a radially situated discharge opening, through which the after-threshed returns can be supplied to a conveyor for the transport of the after-threshed returns to a cleaning device. It would also be conceivable for the discharge opening to supply the after-threshed returns directly to the cleaning device, for example, a preliminary sieve or an upper sieve. An impeller with a horizontal rotation axis for the active conveyance of the returns is located between the outlet of the returns conveyor and the after-threshing device.

In this way, one avoids the accumulation of the returns observed in the state of the art (DE 26 06 588 A1) between the returns conveyor and the after-threshing device.

A paddle elevator and the plane of the outlet are oriented more or less vertically relative to the returns conveyor. However, a screw conveyor or any other conveyor can also be used as a returns conveyor, and the plane of the outlet could also be oriented at an incline, for example, at 45°, relative to the vertical, or horizontally.

In particular, the impeller is located within a generally cylindrical housing adapted to the envelope of the impeller. The housing is provided with an inlet oriented in a vertical plane, which is directly adjacent to the outlet of the returns conveyor, and a lower outlet located in a horizontal plane, to which an upper opening in the housing of the after-threshing device is directly adjacent.

The impeller preferably comprises an inner, rigid element with vanes made of flexible material, which extend radially and are fastened thereon on the outside.

The rotation axis of the impeller and the rotation axes of deflection wheels of a chain of the paddle conveyor preferably run parallel to one another and, in particular, transverse to the forward direction of the combine harvester. The impeller can then be driven by the upper deflection wheel of the paddle conveyor.

The after-threshing device can have a disk that rotates on the vertical axis and is located in the cylindrical housing and with vane-like carriers that are affixed radially thereon, on the upper sides of which straight threshing rods or preferably rods that are bent backwards and contrary to the rotation direction are fastened. To this end and with regard to other preferred features of the after-threshing device per se, reference is made to the disclosure of DE 26 06 538 A1, which by reference is taken up in the documents under consideration.

In accordance with another aspect of the invention, an after-threshing device for a combine harvester is provided, that comprises: a returns conveyor located downstream from a returns auger and with which the returns can be conveyed from a cleaning device upwards and which has an outlet for discharging returns; and an after-threshing element located within a housing and with a vertical rotation axis, which can be acted on in an axial direction from above with the returns from the outlet of the returns conveyor, and a radially situated discharge opening, by means of which after-threshed returns can be supplied to a conveyor for conveyance of the after-threshed returns to the cleaning device; wherein an impeller having an envelope and having a horizontal rotation axis is located between the outlet of the returns conveyor and the after-threshing element for active conveyance of the returns.

The returns conveyor may be a paddle elevator and the outlet may be located in a plane oriented more or less vertically.

The impeller may be located within a generally cylindrical housing adapted to the envelope of the impeller and with a vertical inlet, which is directly adjacent to the outlet of the returns conveyor, and a lower outlet having a horizontal orientation, and to which an upper outlet is directly adjacent in the housing of the after-threshing element, is arranged.

The impeller may comprise an inner, rigid element with vanes of flexible material, which are fastened thereon on the outside and extend radially.

A rotation axis of the impeller and rotation axes of deflection wheels of a chain of the returns conveyor may run parallel.

The impeller may be driven by an upper deflection wheel of the deflection wheels of the returns conveyor. The impeller may carry out the conveyance from above.

The after-threshing element may comprise: a disk which rotates around a vertical axis and which is located in the housing; carriers fastened on said disk as vanes, wherein said carriers extend radially outward; and threshing rods fastened on an upper side of the carriers and extending upward from the upper side of the carriers, wherein the threshing rods are bent in a direction opposite to a direction of rotation of the threshing rods.

In accordance with another aspect of the invention, a cleaning device may comprise a blower; two sieves arranged above one another and disposed to receive air from the blower; and an after-threshing device such as that described above.

In accordance with another aspect of the invention, a combine harvester for harvesting crops may comprise: a frame; wheels supporting the frame for travel over the ground; a threshing device supported on the frame for threshing crop; and a cleaning device described in the paragraph above that is supported on the frame to receive and clean the threshed crop.

BRIEF DESCRIPTION OF THE DRAWINGS

An embodiment of the invention described in more detail below is shown in the drawings in which.

DETAILED DESCRIPTION

Figure 1:
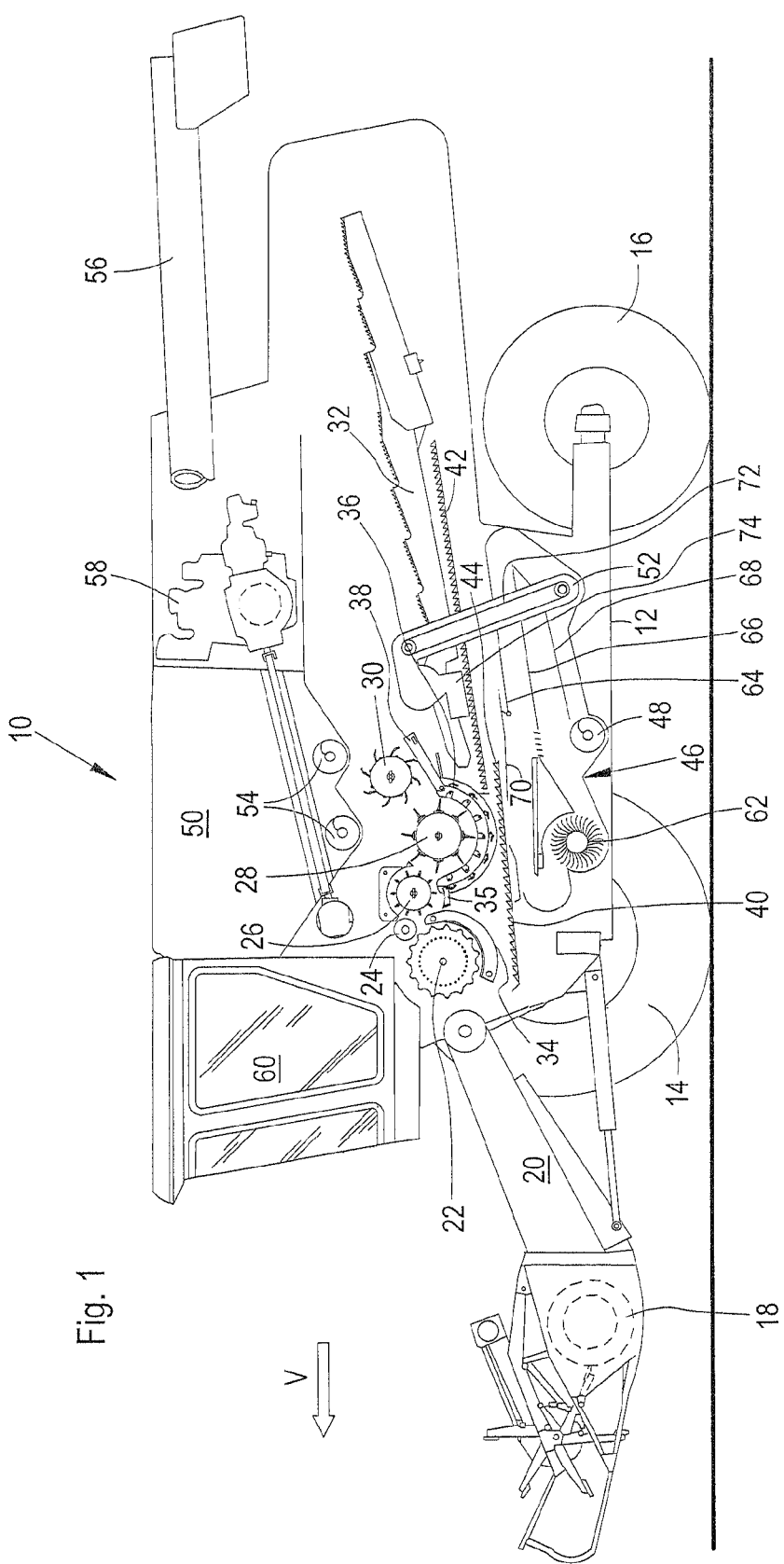
FIG. 1 shows a schematic lateral view of the combine harvester.

FIG. 1 shows a self-propelled combine harvester 10 with a frame 12, which is supported on driven front wheels 14 and steerable back wheels 16 and by which the combine harvester 10 is moved over the ground.

The driven front wheels 14 are turned by driving means (not shown) such as an internal combustion engine or electric motors, so as to move the combine harvester 10 over a field that is to be harvested.

In the description herein, phrases such as "front", "forward", "rearward", "backward", and "back" refer to the direction of travel "V" (FIG. 1) of the combine harvester 10 in the harvesting operation.

In the description herein, phrases such as "upstream" and "downstream" refer to a direction of flow of crop material through the combine harvester 10.

A device for bringing in the harvest, in the form of a cutting tool 18, is connected in a detachable manner on the front end of the combine harvester 10, so as to harvest crops in the form of grains or other cereals during the harvesting operation. The combine harvester 10 threshes the crops and supplies them upwards and backwards by an inclined conveyor 20 to a multi-drum threshing device.

The multi-drum threshing device comprises—arranged in the direction of travel V, one after the other—a threshing drum 22, a scraping drum 24, a conveying drum 26, which works from above, a tangential separator 28, and a turning drum 30. A straw walker 32 is located downstream from the turning drum 30.

The threshing drum 22 is surrounded by a threshing basket 34 in its lower and back area. A closed cover 35 or one provided with openings is located below the conveying drum 26, whereas a stationary cover is located above the conveying drum 26, and a separating basket 36 with adjustable finger elements is situated below the tangential separator 28. A finger rake 38 is located below the turning drum 30.

A front conveying bottom 40 is located below the multi-drum threshing device; when in operation, it carries out a swiveling movement, alternating in a forward and backward direction. A back conveying bottom 42 is located below the straw walker 32 and when in operation, it also carries out a swiveling movement, alternating in a backward and forward direction. The front conveying bottom 40 transports backwards the mixture of grain and chaff that passes through the threshing basket 34 and the tangential separator 28 downwards, whereas the back conveying bottom 42 transports forwards the mixture of grain and chaff flowing through the straw walker 32. The back conveying bottom 42 turns over its mixture to its front end on the front conveying bottom 40, which discharges it downwards by means of a back finger rake 44. The mixture discharged from the front conveying bottom 40 then arrives at a preliminary sieve 70 of a cleaning device 46 and from the preliminary sieve 70 to an upper sieve 64 of that cleaning device.

The cleaning device 46 comprises (in a manner that is in fact known) a blower 62, which produces a flow of air that acts on the upper sieve 64 and a lower sieve 66 from below.

Grain that falls downwards through the lower sieve 66 is supplied by a sloping floor 68 to a grain auger 48, which supplies it to an elevator (not shown), which conveys it to a grain tank 50.

A returns auger 52 gathers the returns, which consist essentially of insufficiently threshed ear parts that have fallen downward on the back end of the lower sieve 66. The returns auger 52 delivers the returns to a returns conveyor 72.

The returns conveyor 72 lifts the returns upward and supplies them to an after-threshing device 74.

The chaff discharged at the back end of the upper sieve 64 is ejected at the back of the sieve device by a rotating chaff distributor, or it is discharged by a straw chopper (not shown) located downstream from the straw walker 32.

The cleaned grain from the grain tank 50 is unloaded by an unloading system with transverse screws 54 and an unloading conveyor 56.

Details of the cleaning device 46 can be found in DE 10 2005 266 608 A1, the disclosure of which is incorporated by reference herein for all that it teaches and particularly for details of the cleaning device 46.

The aforementioned systems are driven by means of a combustion engine 58. The aforementioned systems (and the combine harvester 10 itself) are controlled and guided by an operator from the driver cab 60.

The various devices for the threshing, conveying, cleaning, and separating are located within the frame 12. Outside the frame 12 is an outer sleeve, which for the most part, can be extended.

Figure 2:
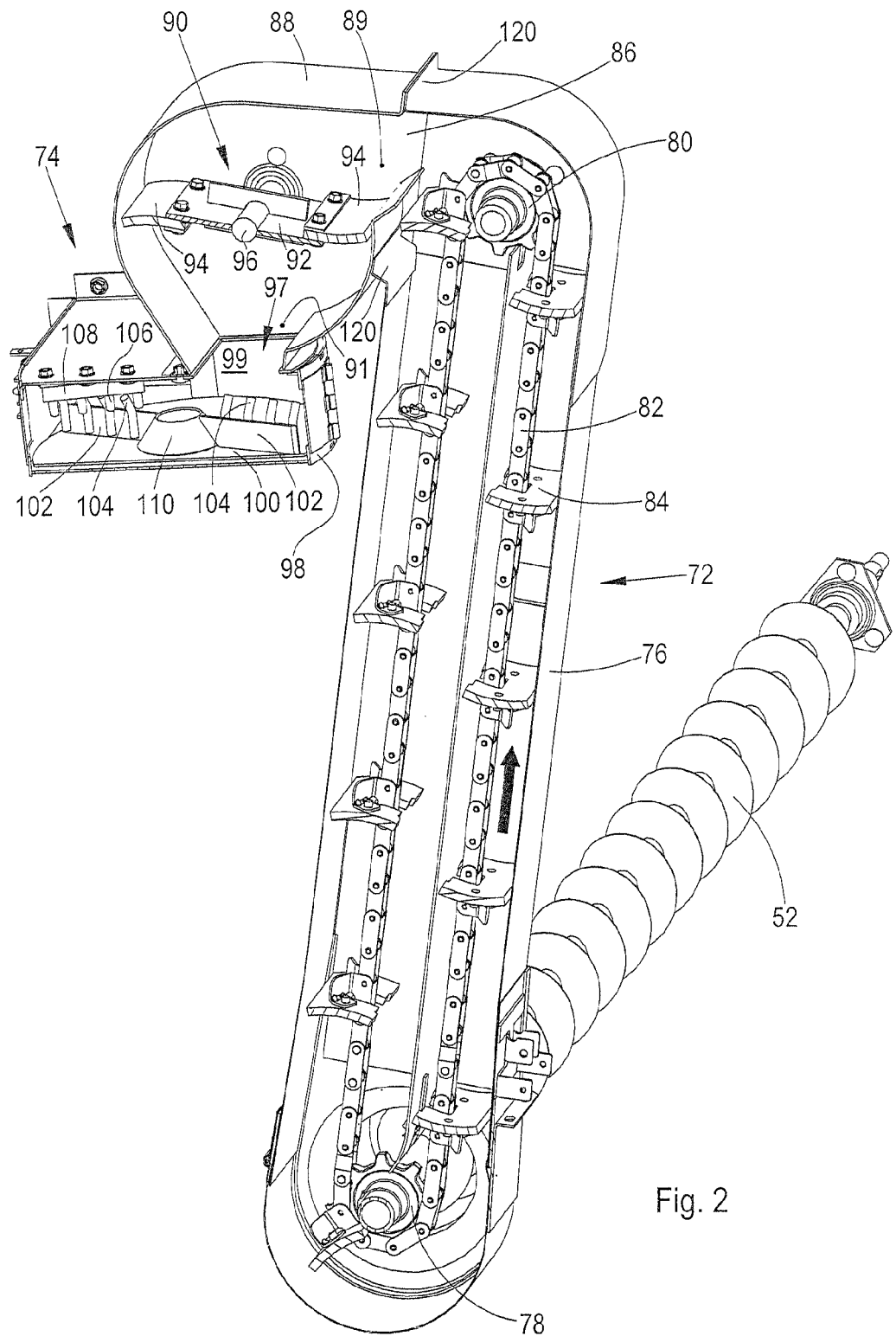
FIG. 2 shows a perspective lateral view of an after-threshing arrangement.

FIG. 2 shows a perspective lateral view of the returns conveyor 72 and the after-threshing device 74, whose lateral covers were removed for viewing purposes. The returns conveyor 72 comprises a housing 76 extending upwards from the returns auger 52, in which housing a paddle elevator is located consisting of a chain 82 moving around a lower deflection wheel 78 and an upper deflection wheel 80, which have rotation axes extending horizontally and transversely relative to the forwards direction V, with paddles 84 fastened thereon. The lower deflection wheel 78 is rigidly connected with the returns auger 52 and is driven by it. The paddle elevator discharges the returns forward in a horizontal direction through an outlet 86 lying in a vertical plane.

A housing 88 with an impeller 90 located therein directly follows the housing 76 of the returns conveyor 72. The inlet opening of the housing 88 coincides with the outlet 86 and the housing is connected above and below the outlet 86 and on its two sides with the housing 76 of the returns conveyor 72 by a flange 120. The housing 88 is generally cylindrical and aside from a funnel-shaped filling chute 89 discharging in the inlet opening and a funnel-shaped ejection chute 91 discharging in a lower outlet 97 that is oriented horizontally and is adapted to the envelope of the impeller 90. The impeller 90 comprises an inner, rigid element 92, which is radially oriented relative to a shaft 96 and with vanes 94 made of flexible material (for example, rubber) fastened thereon on the outside and lying diametrically opposed and extending radially. The element 92 is made to rotate by the shaft 96 extending horizontally and transversely relative to the forward direction V, wherein the vane 94 adjacent to the outlet 86 rotates upward. In this way, the material flow leaving the shaft of the returns conveyor 72 is conducted along the outer (sickle-shaped) wall of the housing 88 and there is no danger of the impeller 90 throwing back material into the returns conveyor 72.

The after-threshing device 74 is located below the housing 88 of the impeller 90. The after-threshing device 74 includes a housing 98 that is cylindrical with a vertical, middle axis and lower and upper cover plates. The upper cover plate of the housing 98 of the after-threshing device 74 is equipped with an upper outlet 99 in the form of a rectangular opening, which follows directly and coincides with the lower outlet 97 of the funnel-shaped ejection chute 91 of the housing 88 of the impeller 90. The after-threshing device 74 includes a rotary after-threshing element that comprises a disk 100 that can rotate around the middle, vertical axis and is located in the housing 98 and with carriers 102 in the form of vanes fastened thereon radially, on whose trailing sides threshing rods 104 bent backwards contrary to the rotation direction are fastened. The threshing rods 104 work together with rods 106 that are stationary and which are fastened on holders 108, which in turn are placed in a detachable manner on the upper cover plate of the housing 98. A truncated cone 110 is fastened between the carriers 102 in the middle on the disk 100.

The driving of the after-threshing element disk 100 can be carried out in a manner that is in fact known (DE 26 06 588 A1) via an impeller gear, whose output drive, driving the after-threshing element disk 100 at a relatively high rpm, can also be used to drive other elements such as a hydraulic pump. The impeller 90 can be driven by the upper deflection wheel 80 of the returns conveyor 72, via a non-depicted drive connection, which for example, can comprise a chain and two pinions or a belt and two belt pulleys.

Figure 3:
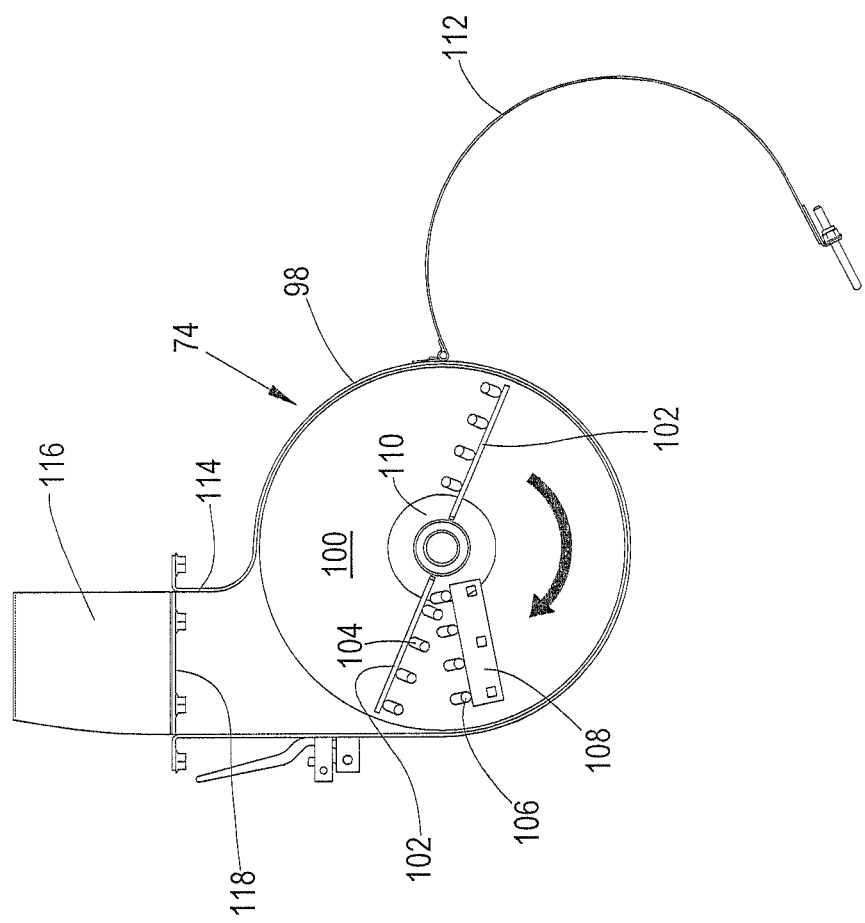
FIG. 3 shows a top view of the after-threshing device with a cover removed exposing the after-threshing element of the after-threshing device.

With the aid of FIG. 3, which shows a top view of the after-threshing device 74, one can see that the lateral wall 112 of the housing 98 of the after-threshing device 74 can swivel to the side for maintenance work. Furthermore, one can see that an imaginary straight line connecting the rods 106 of each holder 108 is not oriented in a precisely radial manner, but rather encloses a leading or lagging angle with the radius of the disk 100, so that the returns are not simultaneously processed by the rods 106 and the threshing rods 104, but rather are staggered in time. FIG. 3 also shows a radial outlet chute 114 of the after-threshing device 74 with a discharge opening 118 lying in a vertical plane, which is followed by an upper guiding plate 116 bent downwards, by means of which the after-threshed returns are ejected in a lateral direction onto the back conveyor bottom 42, which again supplies them to the cleaning device 46. With the guiding plate 116, one attains an approximately homogeneous distribution of the completely threshed returns over the breadth of the conveyor bottom 42. It would also be conceivable to place (non-depicted) cloths, hanging downwards, below the straw walkers 32, which uniformly distribute the returns discharged by the after-threshing device 74 on the conveyor bottom 42. The cloths protruding from the straw walkers 32 downwards into the ejection path of the after-threshing device are alternatingly immersed in the material path by the walker movement. In this way, depending on which walker is in the lower position, it is deflected sooner or later. Alternatively or additionally, it would be possible to move the guiding plate 116 by the straw walker 32 located on the left machine side (comparable with the ejection flap at the end of an ejection spout of a field chopper), in order to make as uniform as possible the material distribution on the conveyor bottom 42.

After all this, one attains the following mode of functioning of the after-threshing device, which is composed of the returns conveyor 72, the impeller 90 with the corresponding housing 88, and the after-threshing device 74. The returns conveyor 72 conveys the returns brought together from the returns auger 52 upwards and ejects them through the outlet 86 in a horizontal direction. The impeller 90 then conveys the returns from above and downwards through the lower outlet 97, the inlet 99 of the housing 98 of the after-threshing device 74 and onto the after-threshing element disc 100, which ejects the sufficiently threshed returns via the radial outlet chute 114 onto the back conveyor bottom 42, wherein they are deflected downwards by the guiding plate 116. The impeller 90 brings about a continuous transport of the returns from the returns conveyor 72 into the after-threshing device 74 and avoids an accumulation and clogging in this transition area.

It should be understood that the particular embodiments shown and discussed herein are not the only ways in which the invention can exist. They are the currently preferred embodiments of the invention. One skilled in the art of agricultural harvester and agricultural harvesting head design and manufacture can readily see other variations that would also fall within the scope of the appended claims.

For example, the multi-drum threshing device shown here is just one variation. As another variation, the multi-drum threshing device could also be replaced by a single transversely arranged threshing drum and a subordinate separating device with a straw walker or one or more separating rotors.

As another variation, a rotating axial separator may be used, the rotating axial separator, having a threshing section and a separating section. As another variation, a single axial separator or two (or more) axial separators arranged next to one another may be used.

The invention claimed is:

1. An after-threshing arrangement for a combine harvester (10), comprising the following:
an upwardly extending returns conveyor (72) having a housing (76) having a lower end and an upper end, with the lower end of the housing being provided with an inlet and with the upper end being provided with an outlet (86);
a returns auger (52) coupled to said inlet of said returns conveyor (72) for conveying returns received from a cleaning device (46), with the returns conveyor (72) conveying the returns upward to, and discharging the returns from, the outlet (86);
an impeller housing (88) having a funnel-shaped filling chute (89) joined to the housing (76) of the returns conveyor (72) at the returns conveyor outlet (86) and having a downwardly directed funnel-shaped ejection chute (91) having an outlet (97);
an after-threshing device (74) including a housing (98) having lower and upper cover plates joined by an upright wall disposed arcuately about a vertical rotation axis and including a discharge chute (114) joined to, and extending radially from said upright wall and having a discharge opening (118);
said after-threshing device (74) further including a rotary after-threshing element comprising a disk (100) mounted on said lower cover plate for rotation about said rotation axis, and said upper cover plate being provided with an inlet opening (99) and being coupled to said impeller housing (88) such that the outlet (97) of the ejection chute (91) is at the inlet opening (99), whereby the disk (100) can be acted on in an axial direction from above with the returns from the outlet (86) of the returns conveyor (72), with disk (100) acting to discharge the returns through the radially situated discharge chute (114) and hence through said discharge opening (118), by means of which after-threshed returns can be supplied to a conveyor (42) for conveyance of the after-threshed returns to the cleaning device (46); and
an impeller (90) being located within said impeller housing (88) and having a horizontal rotation axis located between the outlet (86) of the returns conveyor (72) and the inlet opening (99) of the housing (98) of the after-threshing device (74) and including a paddle arrangement (92, 94, 96) mounted for rotating about said horizontal rotation axis and sweeping into said funnel-shaped filling and ejection chutes (89) and (91) for active conveyance of the returns directly from the outlet (86) of the returns conveyor (72) to the inlet opening (99) of the housing (98) of the after-threshing device (74).

2. The after-threshing arrangement according to claim 1, wherein the returns conveyor (72) is a paddle elevator and the outlet (86) is located in a plane oriented more or less vertically.

3. The after-threshing arrangement according to claim 2, wherein the paddle elevator includes a chain (82) trained about a lower deflection wheel (78) having a lower rotation axis and an upper deflection wheel 80 having an upper rotation axis; and a rotation axis of the impeller (90) and the lower and upper rotation axes, respectively, of the deflection wheels (78) and (80) of the chain (82) of the returns conveyor (72) run parallel to each other.

4. The after-threshing arrangement according to claim 3, wherein the impeller (90) is driven by the upper deflection wheel (80) of the upper and lower deflection wheels (78) and (80) of the returns conveyor (72).

5. The after-threshing arrangement according to claim 1, wherein the impeller housing 88 is generally cylindrical.

6. The after-threshing arrangement according to claim 1, wherein the paddle arrangement of the impeller (90) comprises an inner, rigid element (92) joined to, and projecting radially in opposite directions from, a drive shaft (96) and with a pair of vanes (94) of flexible material respectively extending radially from, and being fastened to opposite ends of, said rigid element (92) and extending radially from said rigid element (92).

7. The after-threshing arrangement according to claim 1, wherein the after-threshing device (74) comprises:
said disk (100) being located in the housing (98);
carriers (102) fastened on said disk (100) as vanes, wherein said carriers (102) extend radially outward; and
threshing rods (104) fastened on a trailing side of the carriers (102) relative to a direction of rotation of the disk (100) and extending upward from the carriers (102), wherein the threshing rods (104) are bent in a direction opposite to the direction of rotation of the disk (100).

8. A cleaning device (46), comprising:
a blower (62):
two sieves (64, 66) arranged above one another and disposed to receive air from the blower (62); and
an after-threshing arrangement according to claim 1.

9. A combine harvester (10) for harvesting crop comprising:
a frame (12);
wheels (14, 16) supporting the frame for travel over the ground;
a threshing device (22, 24, 26, 28, 30, 36) supported on the frame for threshing crop; and a cleaning device (46) according to claim 8 that is supported on the frame (12) to receive and clean the threshed and after-threshed crop.

\* \* \* \* \*